United States Patent
Wicks et al.

[11] Patent Number: 5,949,326
[45] Date of Patent: Sep. 7, 1999

[54] INTERNET MONITORING AND INPUT PAGER

[75] Inventors: James E. Wicks, San Francisco, Calif.; Eduardo Sciammarella, Hoboken, N.J.

[73] Assignees: Sony Corporation, Tokyo, Japan; Sony Electronics, Inc., Park Ridge, N.J.

[21] Appl. No.: 08/799,827

[22] Filed: Feb. 13, 1997

[51] Int. Cl.[6] ................................. G08B 27/00
[52] U.S. Cl. .............. 340/286.01; 340/286.02; 340/825.44; 340/825.47; 364/58; 379/57; 379/58
[58] Field of Search ............... 340/286.01, 825.44, 340/825.55, 825.52, 825.47; 395/154, 909; 379/58, 96, 507, 59, 57; 364/514 R

[56] References Cited

U.S. PATENT DOCUMENTS

| | | | |
|---|---|---|---|
| 4,415,065 | 11/1983 | Sandstedt | 340/825.44 |
| 4,644,351 | 2/1987 | Zabarsky et al. | 340/825.44 |
| 4,951,039 | 8/1990 | Schwendeman et al. | 345/473 |
| 5,173,688 | 12/1992 | DeLuca et al. | 340/825.44 |
| 5,331,431 | 7/1994 | Jasinski | 358/462 |
| 5,446,678 | 8/1995 | Saltzstein et al. | 364/514 R |
| 5,452,356 | 9/1995 | Albert | 380/9 |
| 5,481,255 | 1/1996 | Albert et al. | 340/825.55 |
| 5,491,785 | 2/1996 | Robson et al. | 395/162 |
| 5,495,344 | 2/1996 | Callaway, Jr. et al. | 358/407 |
| 5,508,695 | 4/1996 | Nelson et al. | 340/825.37 |
| 5,535,428 | 7/1996 | King et al. | 455/38.4 |
| 5,561,703 | 10/1996 | Arledge et al. | 379/57 |
| 5,596,318 | 1/1997 | Mitchell | 340/825.44 |
| 5,604,788 | 2/1997 | Tett | 379/58 |
| 5,675,507 | 10/1997 | Bobo, II | 364/514 |
| 5,727,159 | 3/1998 | Kikinis | 395/200.76 |

*Primary Examiner*—Edward Lefkowitz
*Assistant Examiner*—Davetta Woods
*Attorney, Agent, or Firm*—Ronald P. Kananen; Rader, Fishman & Grauer

[57] ABSTRACT

A novel paging technology allows a pager user limited wireless access to the internet via a paging system. The pager user may file an interest profile with the pager system service provider listing internet sites from which the pager user desires information. The service provider may access those sites and provide the information to the subscriber's pager either regularly or when signalled to do so by the pager user. The pager may further include an input device, such as a virtual keyboard, with which e-mail or chat room messages may be entered. The pager then transmits the messages to the paging system which conveys them to the internet.

10 Claims, 3 Drawing Sheets

INTERNET MONITORING AND INPUT PAGER

FIELD OF THE INVENTION

The present invention relates generally to the field of wireless pagers. More particularly, the present invention relates to an application of wireless pager technology as a means of wireless connection to the internet.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but also to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information, recreation and communication demands of pager users.

Another revolution in communication has occurred in modern society with the increasing popularity and accessibility of the internet. Through this ever-growing network of computers, people are able to transmit messages, share information, discuss topics, and communicate in a wider variety of ways that was ever before possible.

However, in general, access to the internet requires a computer which typically maintains a wireline, e.g. a phone line, connection to the internet. This requirement of a stationary access point for the internet is clearly contrary to the needs of mobile pager user as described above. Accordingly, there is a need for a wireless means of taking advantage of the communications capabilities of the internet.

SUMMARY OF THE INVENTION

It is an object of the present invention to meet the above identified needs and others. More particularly, it is an object of the present invention to provide a method of using a paging system and a novel paging system to provide limited wireless access to the internet.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a method of using a paging system to provide wireless internet access comprising the steps of: accessing the internet; downloading data from the internet; and transmitting the downloaded data to a pager with a paging network.

In more detail, the method of the present invention may further include the steps of generating an interest profile for a pager user which provides instruction as to what data should be downloaded in the step of downloading data; storing the profile in a database; and retrieving the profile from the database. The step of downloading data is then carried out in accordance with the retrieved profile.

The method of the present invention may also encompass the step of signalling the paging system with the pager to request the system to perform the steps of downloading and transmitting. The steps of downloading and transmitting are accordingly performed in response to the step of signalling.

In addition to such signalling, the method of the present invention may also include the steps of entering input to a pager; transmitting the input with the pager to a paging system; receiving the transmitted input with the paging system; connecting to the internet with the paging system; and inputting the transmitted input to the internet. The transmitted input may comprise an e-mail message.

In addition to the above described method, the present invention may encompass a paging system for providing wireless internet access which includes: an electronic connection to the internet; a computer for accessing the internet via the connection and for downloading data from the internet; a transmitter for transmitting the data to a pager; a database for storing instructions from pager users as to what data should be downloaded from the internet; an electronic connection between the database and the computer whereby the computer downloads data in accordance with the instructions stored in the database; and a receiver for receiving transmissions from a pager.

A pager of the present invention may include: an input device, e.g., a virtual keyboard; and a transmitter for transmitting input to the paging system. The computer of the paging system thus may receive input from the pager and submit the received input to the internet. With the input device, a signal transmitted from the pager may control when the computer accesses the internet and downloads data.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained. Under the principles of the present invention, pager technology can be adapted to provide wireless access to a variety of internet features and services.

Figure 1:
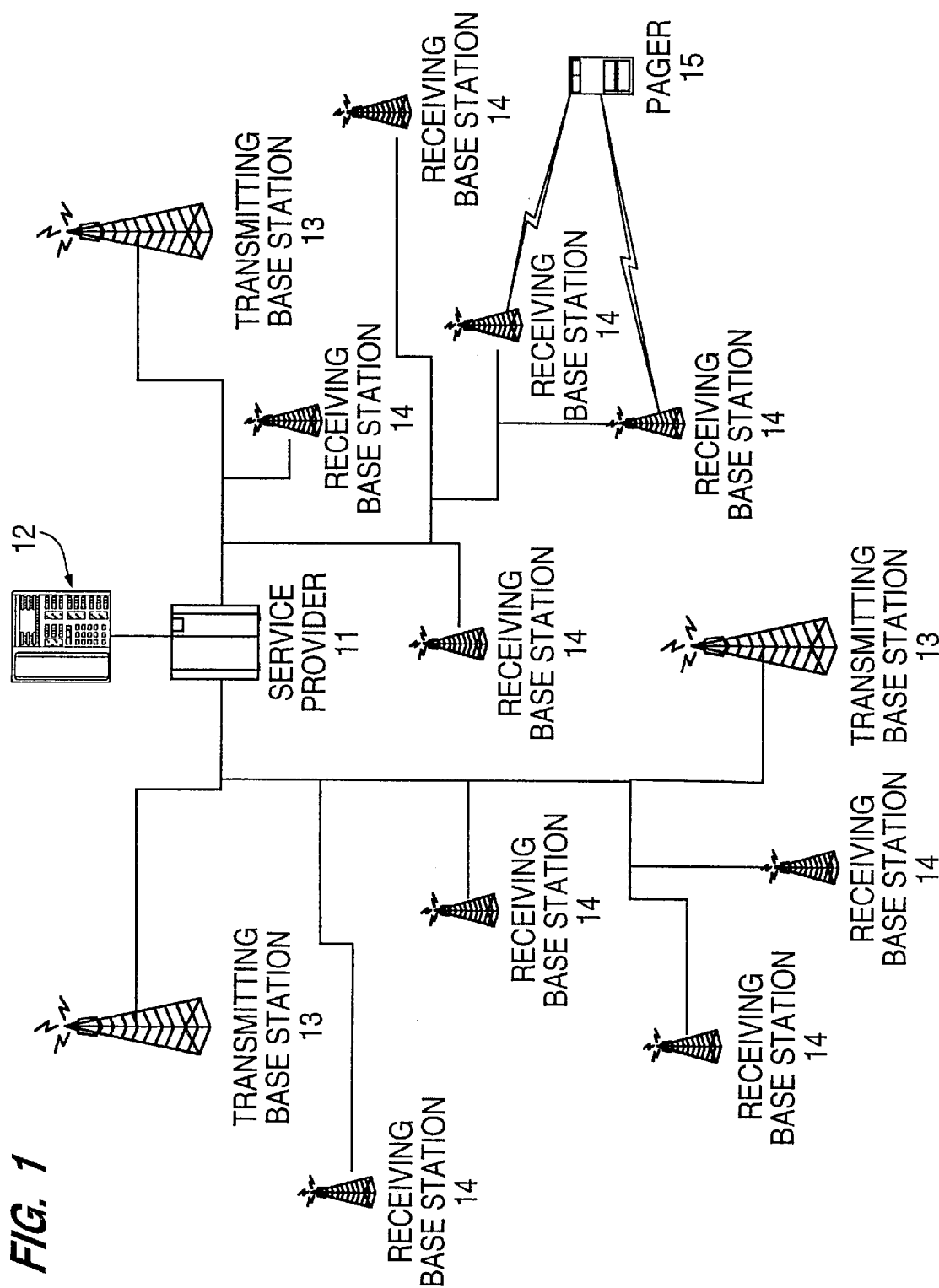
FIG. 1 is a schematic diagram of a conventional two-way paging network with which the present invention may be practiced.
Figure 2:
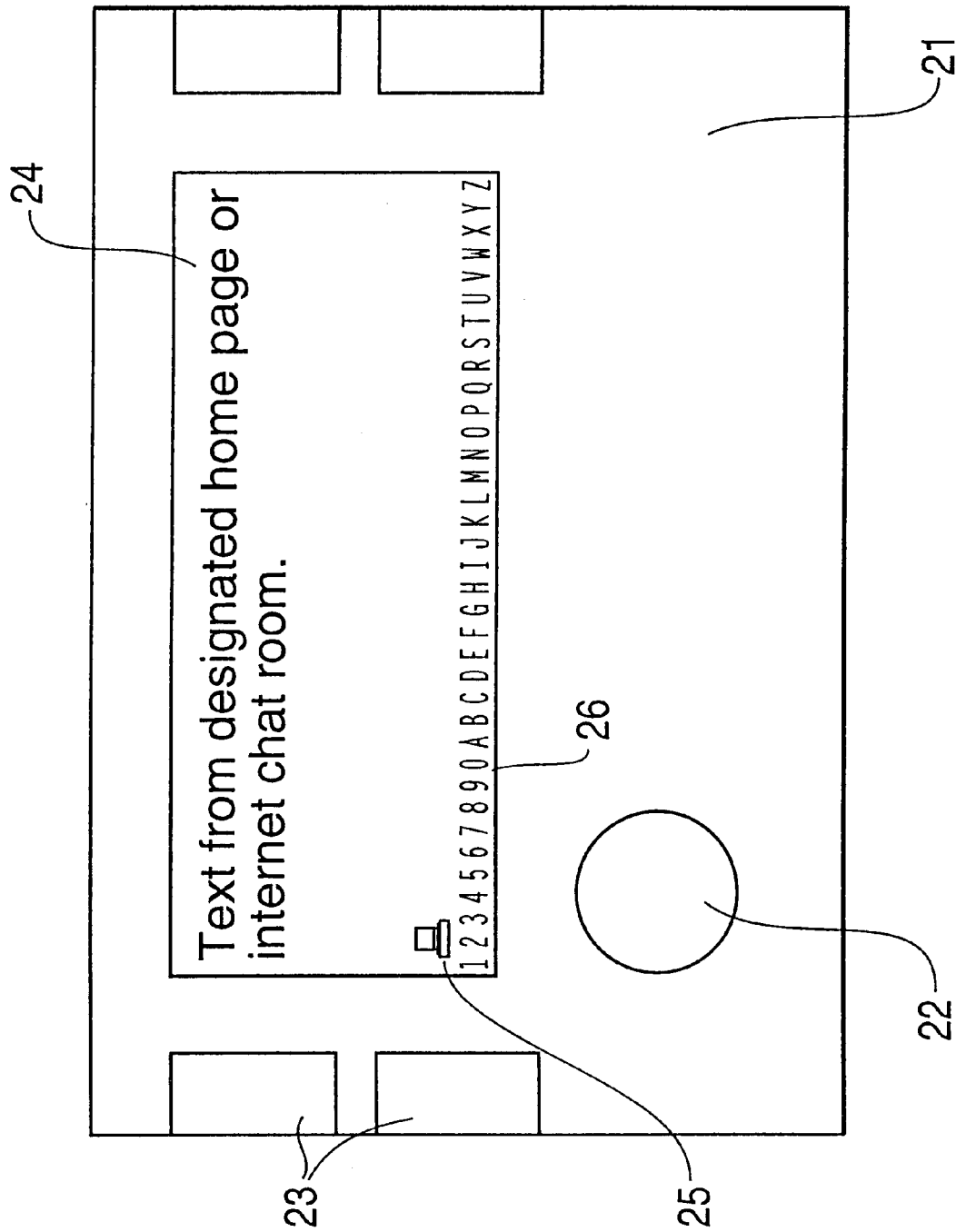
FIG. 2 is a diagram of a pager according to the principles of the present invention.
Figure 3:
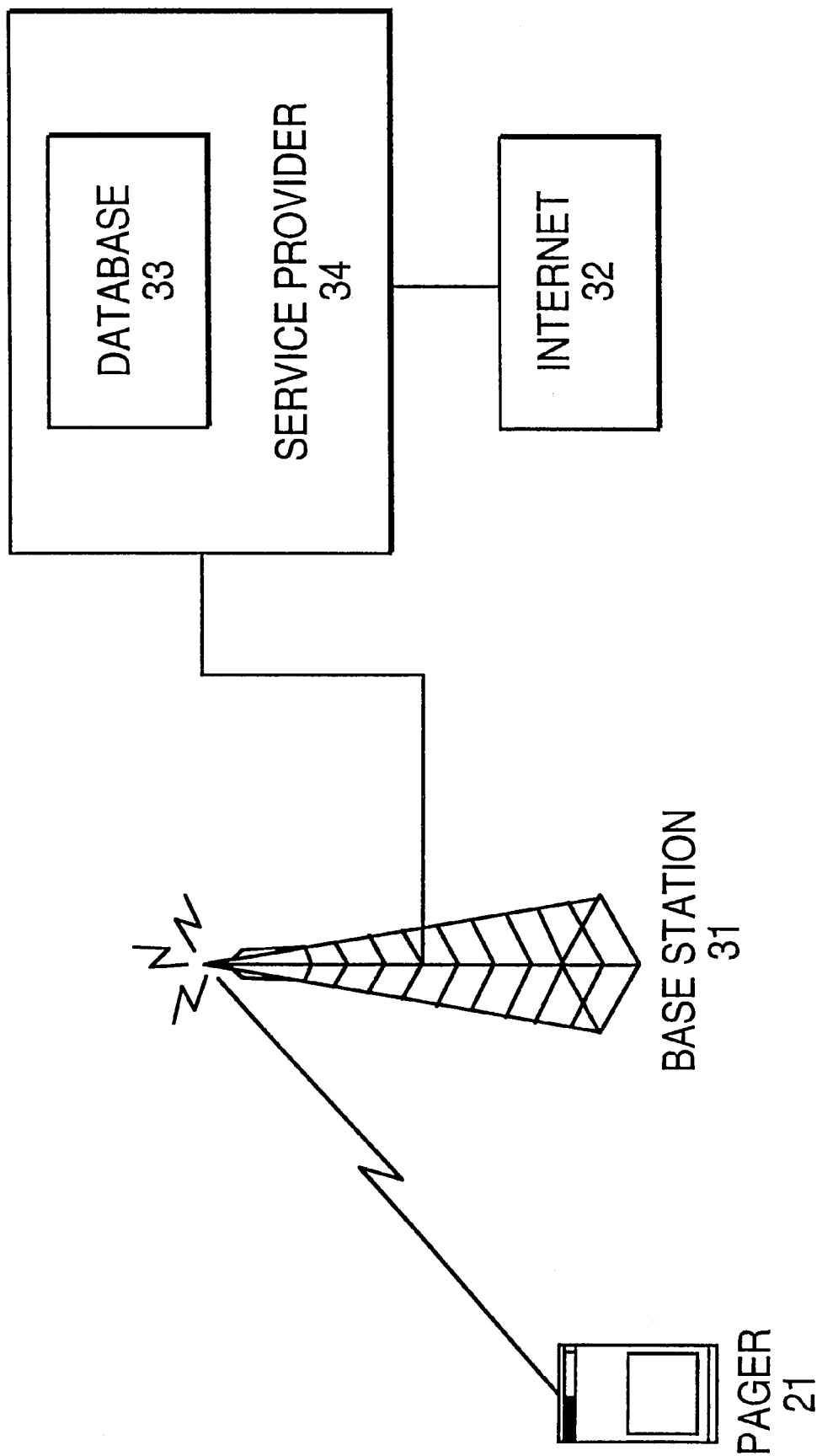
FIG. 3 is a diagram of the key components of the system of the present invention.

As illustrated in FIG. 3, under the principles of the present invention, a paging system service provider 34 maintains a connection to the internet 32. This connection may be a direct connection or a connection through an internet service provider.

When a subscriber contracts with the service provider 34 for pager service, the subscriber may indicate a desire for the service provider's internet connection service. Under the principles of the present invention, the subscriber may then provide the service provider 34 with an interest profile.

A subscribing user's interest profile may list particular home pages and/or chat rooms in which the pager user is interested. The service provider 34 will store the pager user's interest profile in a database 33 for use by the paging system. As described above, a pager and paging system may allow for one-way or two-way paging. The principles and features of the present invention may be practiced with either type of paging system.

In a one-way paging system, the service provider 34 will periodically retrieve from the database the list of internet chat rooms or sites in which the pager user is interested. The service provider 34 will then electronically visit those sites on the internet 32 and collect current information to be transmitted to the subscribing pager user. How frequently the internet is so monitored and information is collected may be determined under the agreement between the service provider 34 and the subscribing pager user.

For a chat room, the service provider 34 may simply collect a certain number of most recent comments or, if a relatively large number of pager users are interested in that chat room, summarize the recent conversation. In either event, the service provider 34 will periodically transmit the collected or summarized information from the chat room to the pager user's pager 21 via base station 31.

For a home page, the service provider 34 will collect the text of the home page separated from the graphics. The text of the home page can then be transmitted to the pager 21. Again, the service provider 34 may transmit actual text from the home page or may summarize the content of the home page.

Additionally, the service provider 34 may maintain a record of the text of the home page as of the last time it was collected and transmitted to pager users. If the service provider 34 maintains such a record, only that text which has changed or been added since the previous collection need be transmitted to subscribing pager users.

In a two-way paging system, the possibilities for a pager user to monitor internet content and communicate wirelessly using the internet's capabilities are drastically increased. As in the one-way paging system, the service provider 34 will obtain an interest profile from a subscriber to the two-way paging service and maintain that profile in a database 33. However, rather than periodically collecting information, the service provider 34 will collect text from the designated chat rooms and home pages only when signaled to do so by the pager user.

The pager 21 of the present invention may have a dedicated button which, when pressed, signals the service provider 34 to retrieve the pager user's interest profile from database 33 and collect information from the designated sites 32. However, in the preferred embodiment, illustrated in FIG. 3, the user's pager 21 includes a liquid crystal display 24. On the display 24, the user will find an icon 25 which, when selected, sends the request to the service provider to collect information from the internet for the user.

To select the icon 25, the pager is provided with buttons 23 for moving a cursor (not shown) on display 24. When the cursor is highlighting the icon 25, the user presses the select button 22. The user's pager may be programmed with this feature by the service provider when the contract between the service provider and the pager user is set up and the pager user indicates a desire for the internet connection service.

Moreover, pager 21 may be equipped, under the principles of the present invention, with a virtual keyboard 26. The virtual keyboard may display the letters of the alphabet and digits 0 to 9 on the display 24 of pager 21. Similar to the process of selecting icon 25, the pager user may use buttons 23 to move a cursor through the virtual keyboard and button 22 to select a sequence of letters to create a message. Preferably, the message is displayed on display 24. When the message is complete, the pager 21 transmits the message to the paging system.

With the virtual keyboard, the pager user may not only receive information from the internet, but may also submit information. For example, if the pager user wishes to comment on the conversation in a chat room which has been collected and transmitted by the service provider, the pager user may enter a comment using virtual keyboard 26 which is then transmitted by pager 21, via base station 31, to the service provider 34.

The service provider then interjects the comment in the appropriate chat room. The pager user may then signal the service provider to collect responses and transmit them to the pager user's pager.

The pager user may similarly use the virtual keyboard 26 to create and transmit input for a home page that has been monitored. For example, the home page may allow the user to request a stock quote or search a database. The pager user may create the appropriate input using the virtual keyboard 26 and submit the input via the service provider's paging network and internet connection.

Similarly, the virtual keyboard 26 of pager 21 can be used to create e-mail messages that may be transmitted to the service provider 34 and then sent via the internet 32. Those skilled in the art will recognize that other equivalent alphanumeric input devices could be used under the principles of the present invention in place of the virtual keyboard 26.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of using a paging system to provide wireless internet access comprising the steps of:

accessing a home page or a chat room on the internet;

downloading data from said home page or chat room;

comparing said downloaded data to previously downloaded data from said same home page or chat room; and subsequent to said comparing, transmitting, to said pager, data indicating any difference between said downloaded data and said previously downloaded data.

2. A system as claimed in claim 1, wherein said computer compares said downloaded data to previously downloaded data from said same home page or chat room.

3. A paging system for providing wireless internet access comprising:

an electronic connection to the internet;

a computer for accessing the internet via said connection and downloading data from a home page or chat room on the internet; and a transmitter for transmitting said data to a pager;

wherein said computer compares said downloaded data to previously downloaded data from said same home page or chat room; and wherein said computer transmits, to said pager, data indicating any difference between said downloaded data and said previously downloaded data.

4. A method as claimed in claim 1, further comprising the steps of:

generating an interest profile for a pager user which designates at least one home page or chat room from which data should be downloaded in said step of downloading data;

storing said profile in a database; and retrieving said profile from said database;

wherein said step of downloading data is carried out in accordance with said retrieved profile.

5. A method as claimed in claim 1, further comprising the step of signaling said paging system with said pager to perform said steps of downloading and transmitting, and wherein said steps of downloading and transmitting are performed in response to said step of signaling.

6. A paging system as claimed in claim 3, further comprising:

a database for storing instructions from pager users designating at least one home page or chat room from which data should be downloaded from the internet;

an electronic connection between said database and said computer;

wherein said computer downloads data in accordance with said instructions stored in said database.

7. A pager system as claimed in claim 3, further comprising:

a receiver for receiving transmissions from a pager; and a pager having:

an input device; and a transmitter for transmitting input to said paging system;

wherein said computer submits input received from said pager to the internet.

8. A pager system as claimed in claim 3, wherein said computer accesses the internet and downloads said data in response to a signal transmitted from a pager.

9. A pager system as claimed in claim 7, wherein said input device is a virtual keyboard.

10. A pager system as claimed in claim 7, wherein said input is an e-mail message.

* * * * *